(12) United States Patent
Weber et al.

(10) Patent No.: US 7,757,024 B2
(45) Date of Patent: Jul. 13, 2010

(54) DUAL PORTING SERIAL ADVANCED TECHNOLOGY ATTACHMENT DISK DRIVES FOR FAULT TOLERANT APPLICATIONS

(75) Inventors: Bret S. Weber, Wichita, KS (US); John V. Sherman, Derby, KS (US)

(73) Assignee: LSI Logic Corporation, Milpitas, CA (US)

( * ) Notice: Subject to any disclaimer, the term of this patent is extended or adjusted under 35 U.S.C. 154(b) by 144 days.

(21) Appl. No.: 12/008,946

(22) Filed: Jan. 15, 2008

(65) Prior Publication Data
US 2008/0189384 A1 Aug. 7, 2008

Related U.S. Application Data

(63) Continuation of application No. 10/025,256, filed on Dec. 19, 2001, now abandoned.

(51) Int. Cl.
*G06F 13/12* (2006.01)

(52) U.S. Cl. .............................. 710/74; 710/36; 710/38

(58) Field of Classification Search .................... None
See application file for complete search history.

(56) References Cited

U.S. PATENT DOCUMENTS

| | | | |
|---|---|---|---|
| 6,173,374 B1 * | 1/2001 | Heil et al. ................... | 711/148 |
| 6,898,730 B1 * | 5/2005 | Hanan .......................... | 714/7 |
| 2002/0007447 A1 * | 1/2002 | Oue ........................... | 711/162 |
| 2003/0079076 A1 * | 4/2003 | Sangveraphunski et al. . | 710/315 |

* cited by examiner

*Primary Examiner*—Eron J Sorrell
(74) *Attorney, Agent, or Firm*—Suiter Swantz pc llo

(57) ABSTRACT

The present invention is directed to an apparatus capable of dual porting a serial advanced technology attachment (SATA) disk drive in a fault tolerant communication system, such as fiber channel. The dual porting apparatus includes two idle regenerators coupled to two serial master devices, a synchronization logic capable of synchronizing the communications between one of the idle regenerators and a third idle regenerator coupled to the SATA disk drive. Furthermore the dual porting apparatus may include an auto detector capable of enabling either of the first two idle regenerators, thus effectively switching between the two.

17 Claims, 3 Drawing Sheets

DUAL PORTING SERIAL ADVANCED TECHNOLOGY ATTACHMENT DISK DRIVES FOR FAULT TOLERANT APPLICATIONS

CROSS-REFERENCE TO RELATED APPLICATIONS

The present application is a continuation application and claims priority under 35 U.S.C. §120 to U.S. non-provisional application Ser. No. 10/025,256 entitled: Dual Porting Serial Advanced Technology Attachment Disk Drives for Fault Tolerant Applications filed Dec. 19, 2001, which is hereby incorporated by reference in its entirety.

FIELD OF THE INVENTION

The present invention generally relates to the field of data storage, and particularly to a system for utilizing serial disk drives in fault tolerant multi-initiated applications.

BACKGROUND OF THE INVENTION

Data storage has become increasingly important as information handling systems become capable of handling and communicating more data. Currently, improvements to data storage systems are aimed at increasing the amount of data and providing fault tolerant systems. While data storage systems have become more efficient at handling large amounts of data in a fault tolerant manner, typically such fault-tolerant data storage systems often are cost-prohibitive.

Expensive fault tolerant data storage systems therefore may not be implemented in certain situations where their cost is not justified by the design application. As a result, information handling systems often are configured with lower cost data storage systems. One example of this cost savings measure is in the implementation of serial advanced technology attachment (SATA) disk drives in place of fibre channel disk drives.

Current fibre channel disk drives are multi-ported and offer fault tolerant interfacing with external components. One of the drawbacks of including a fibre channel disk drive in a system is the drive's price difference. Presently fibre channel disk drives typically are between 3 to 6 times the price of a SATA disk drive, for a comparable storage capacity. Thus designers often may include a SATA drive instead of a fibre channel drive in certain applications.

While serial disk drive offer increased cost savings over fibre channel drives, the inherent single ported design are often a source of failure, thus, reducing the availability of data. It is this single point of failure which may cause designers either to include costly fibre channel disk drives or risk potential data loss.

Therefore, it would be desirable to provide a system and method for cost-effectively utilizing serial storage devices in a fault tolerant applications, thereby allowing for the utilization of more cost effective serial storage devices without the drawbacks inherent to a single ported system.

SUMMARY OF THE INVENTION

Accordingly, the present invention is directed to an apparatus and method for implementing dual porting of an inherently single ported serial disk drive, such as a SATA disk drive. The inclusion of an apparatus of the present invention allows a single ported serial disk drive to operate, in a fault-tolerant system such as a system employing fibre channel based communication without the previously experienced fault drawbacks.

An apparatus for dual porting a serial disk drive of the present invention in the presently preferred embodiment is connected through the back panel of an information handling system utilizing a peripheral component interface (PCI) to a first and a second SATA master control devices which are operating in a fibre channel based communication system. In the present embodiment the dual porting apparatus is included in a disk drive canister board additionally containing a SATA disk drive. Further by including the dual porting apparatus in the disk drive canister board in the event of a failure the dual porting apparatus may be easily replaced.

In a further embodiment the dual porting apparatus contains a first and a second idle regenerator connected to a first and a second SATA master device, respectively. The first and the second idle regenerators being capable of transmitting and receiving signals to their respective SATA master devices. Included in the dual porting apparatus is a third idle regenerator connected to the first and the second idle regenerators. The third idle regenerator additionally connected to a serial disk drive, such as a SATA disk drive. The third idle regenerator is capable of receiving and transmitting signals to the serial disk drive. Further included in the dual porting apparatus is synchronization logic capable of synchronizing the transfer between one of the first idle regenerator and the second idle regenerator and the third idle regenerator.

Additionally, the dual porting apparatus, in contemplated embodiments, is capable of receiving control signals, thereby controlling which idle generator is enabled from a SATA master device. In further embodiments the apparatus for dual porting a serial disk drive includes an auto detector capable of determining the presence/absence of idle characters from the first and the second SATA master devices. Thus the auto detector may determine which SATA master device is active and thus enable a single SATA master device at a time.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the present invention, examples of which are illustrated in the accompanying drawings.

Figure 1:
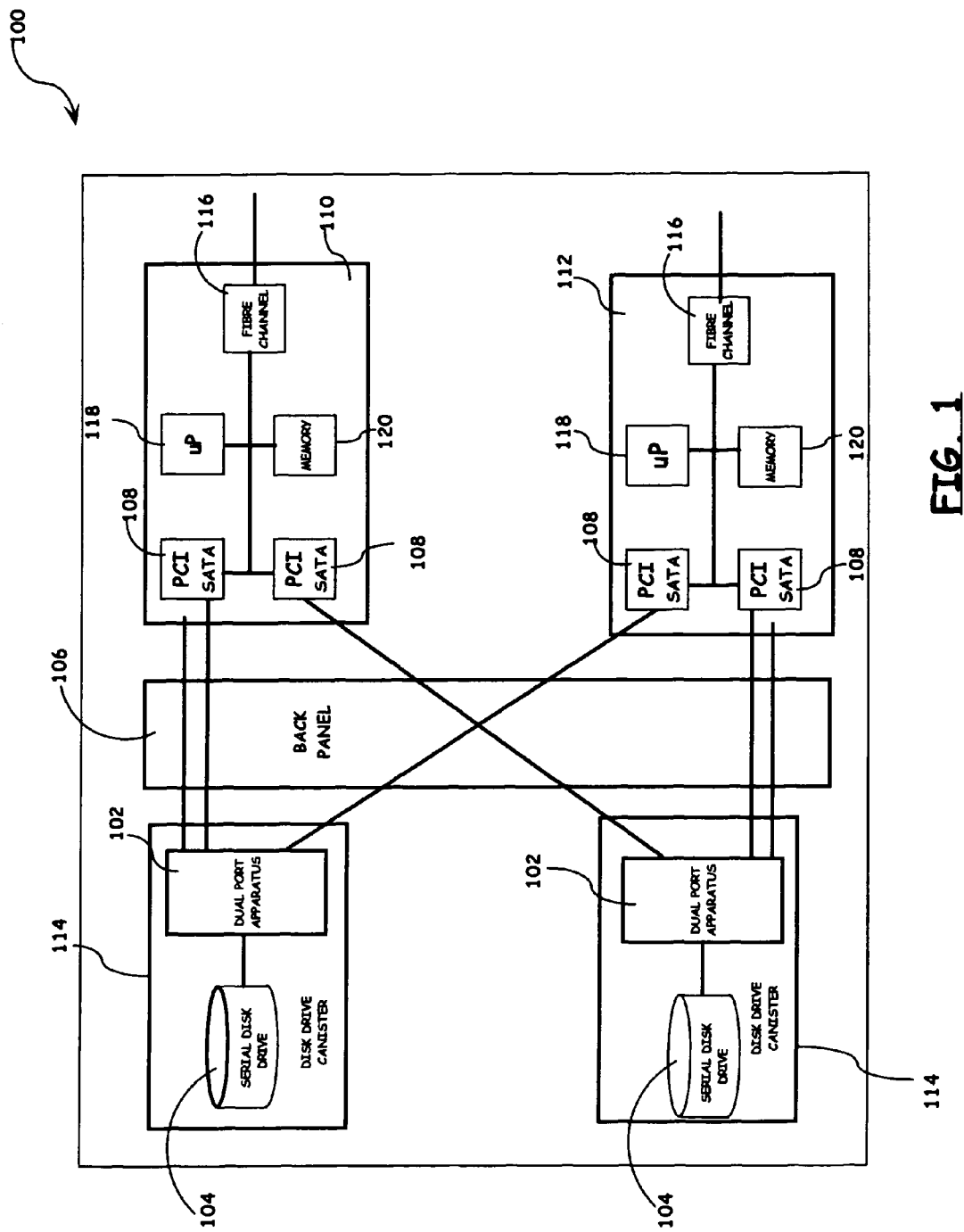
FIG. 1 is an overview illustration of an exemplary embodiment wherein an apparatus for dual poring a serial disk drive in an information handling system.
Figure 2:
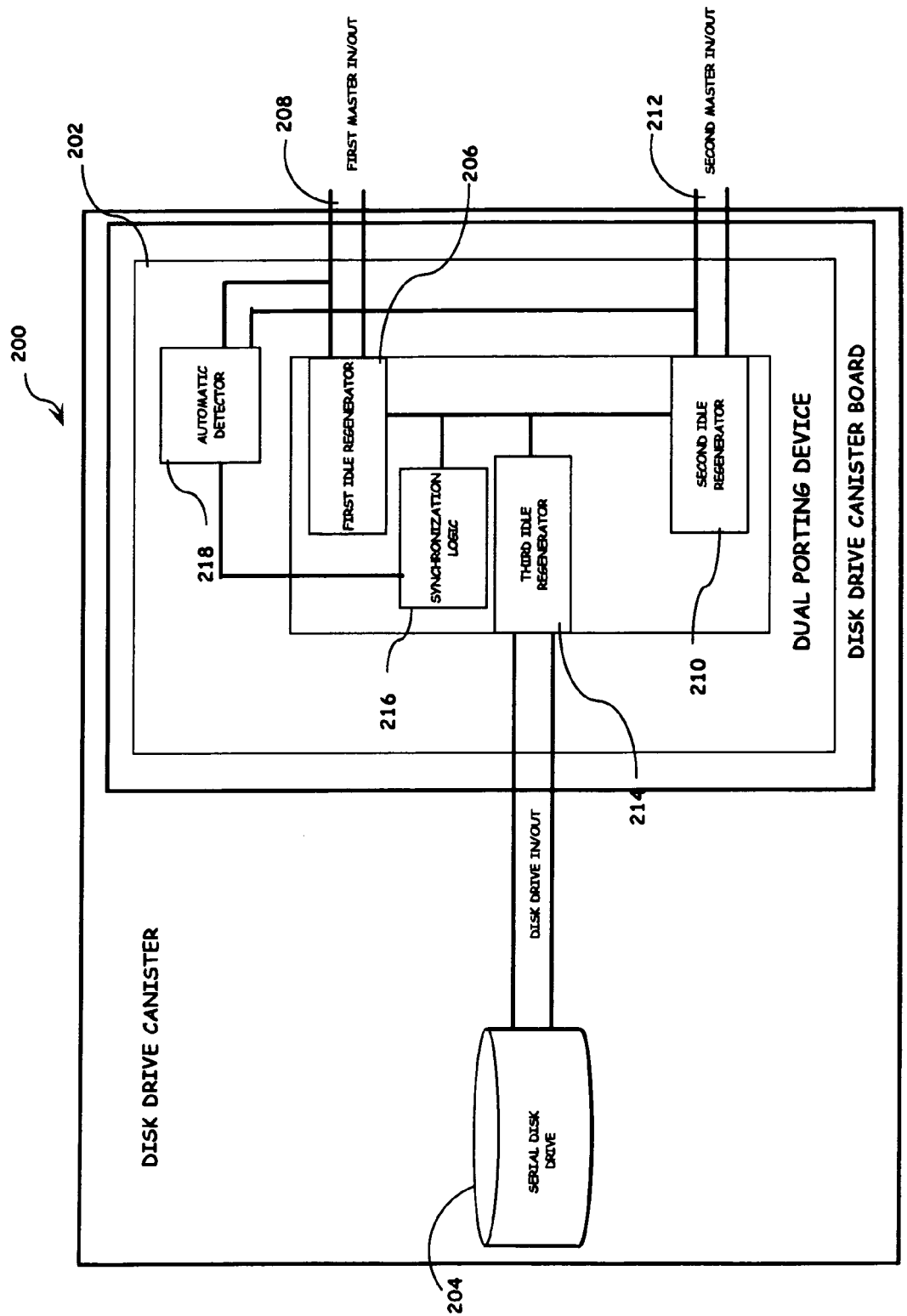
FIG. 2 is an overview illustration of an exemplary embodiment an apparatus for dual porting a serial disk drive in a disk drive canister board.
Figure 3:
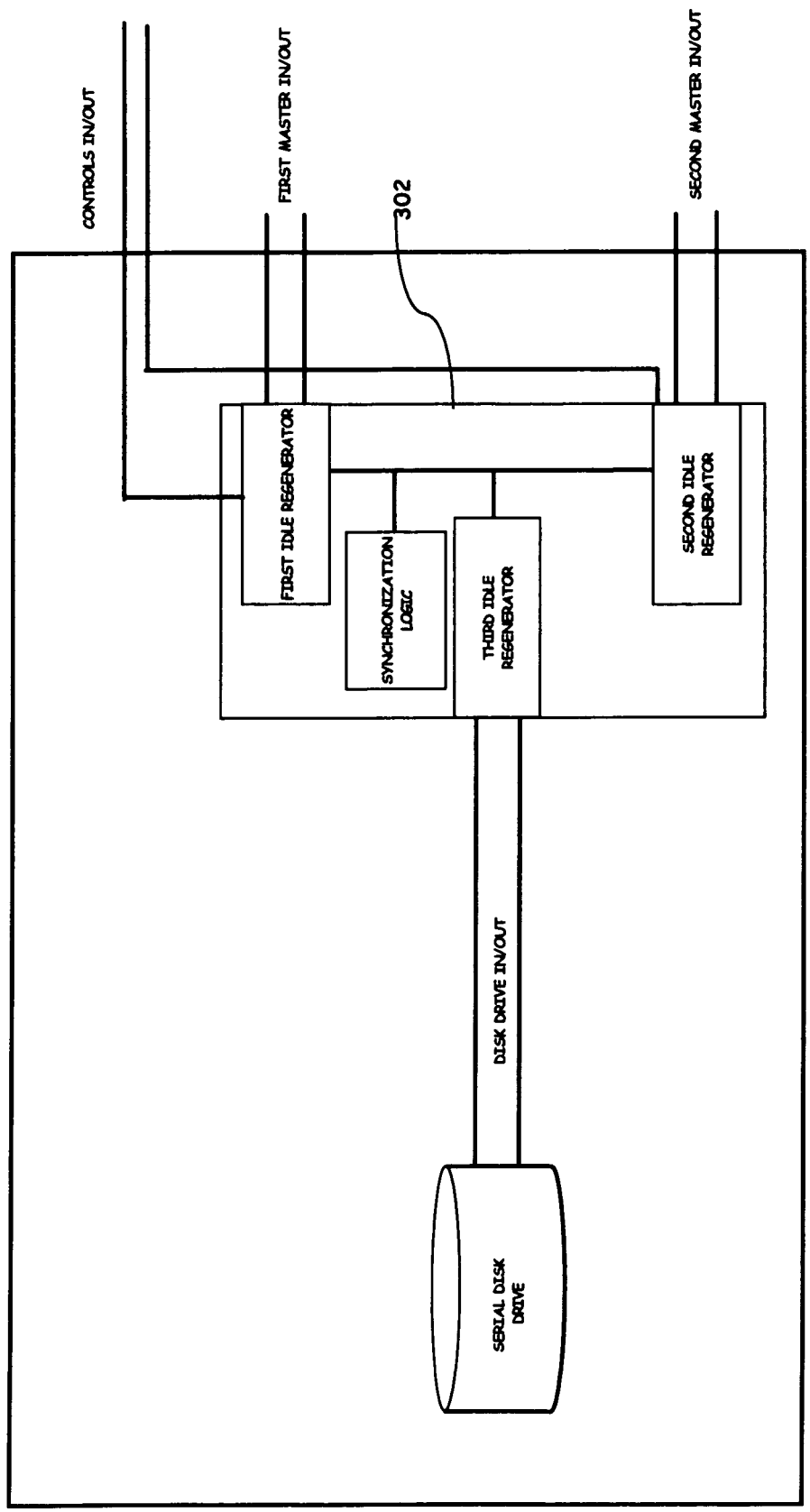
FIG. 3 is an overview illustration of an apparatus for dual porting a serial disk drive with capability for accepting control signal from an external source.

Referring generally now to FIGS. 1 through 3, exemplary embodiments of the present invention are discussed, wherein an apparatus for utilizing single ported serial disk drives, such as SATA disk drives in multi-ported fault tolerant applications are discussed. Fault tolerant storage systems such as fibre channel disk drives offer increased functionality over SATA drives which are subject to a single point of failure, thus reducing the availability of data to the system.

While fibre channel drives offer advantages over that of SATA drives, the high cost of fibre channel drives continues to be a factor in overall utilization. For example, fibre channel disk drives are often utilized in high performance information handling systems. Therefore, the current invention provides an apparatus to incorporate SATA drives into fault-tolerant applications without the previously experienced single point failure associated with SATA drives.

Referring now to FIG. 1, in a first embodiment of the present invention an apparatus for dual porting a serial disk drive 102, such as a SATA drive 104, is discussed. In the current embodiment, the dual porting apparatus 102 is included on a disk drive canister 114. The present implementation allows for the utilization of the SATA drive 104 in a fibre channel environment without the drawbacks associated with single point failures. In the present embodiment, the dual porting apparatus 102 is employed as part of the disk drive canister 114 incorporated in an information handling system 100.

Furthermore, the arrangement of disk drive canister 114 including associated SATA drives 104 and dual porting apparatus 102 allows for redundancy in the information handling system 100, thus reducing the risk of a failure.

In the present embodiment, the dual porting apparatus 102 is connected to a first and a second SATA master devices 110 & 112 through a back panel 106 of the information handling system 100 through peripheral component interfaces (PCI) 108 implemented in the first and second SATA master devices 110 & 112. It is to be understood that various interfaces may be employed as contemplated by one of ordinary skill in the art without departing from the spirit and scope of the present invention, and it is the intention of the present invention to encompass and include these variations. For example the present interface may be incorporated in a proprietary bus or the like. For present purposes the first and the second SATA master devices are substantially similar and are merely referred to as "first and second" SATA master devices 110 & 112 for convenience.

In the present embodiment, the first and second SATA master devices 110 & 112 individually include a fibre channel connection 116. Furthermore, the first and second SATA master devices include a uniprocessor (uP) 118 and a memory 120.

Additionally, in the present embodiment the SATA master devices 110 & 112 are capable of providing control signals from a higher level to the dual porting apparatus 102 ensuring that only a single disk drive canister 114 is enabled at a time. In further embodiments, the first and the second SATA master devices 110 & 112 are continuously enabled with controls executed at a higher level guaranteeing that only a single SATA master device is enabled at a time. For example, by sending control signals from a higher level, switching in the middle of a command is prevented.

Referring now to FIG. 2, a disk drive canister 200 including a dual porting apparatus 202 for porting a serial disk drive is discussed. In the present embodiment, the dual porting apparatus 202 may be connected between a SATA disk drive 204 and the back panel of an information handling system, such as the arrangement discussed in FIG. 1, thus effectively multiplexing the serial disk drive 204. In the current embodiment the dual porting apparatus 202 is integrated in the disk drive canister 200 thus allowing for ease of replacement in the event of failure.

The present embodiment thus allows for the incorporation of the SATA disk drive 204 into a fault tolerant environment, such as fibre channel based systems without the drawback of a single failure point previously experienced with SATA drive included without the dual porting apparatus 202 of the present invention. Further, through implementation of the present invention the SATA drive 204 may continue to receive idle characters during utilization.

The dual porting apparatus 202 includes a first idle regenerator 206. The first idle regenerator 206 is connected to a first serial master device, such as discussed in FIG. 1. The first idle regenerator 206 in the present embodiment is capable of transmitting and receiving signals to the first serial master device via an input/output connection 208. In the current embodiment the input/output connection is made utilizing a PCI, although it is contemplated that other interfaces are capable of utilization for this purpose without departing from the scope and spirit of the present invention. For example, the interface may be implemented without a processor or be embodied in a proprietary bus, or the like.

The dual porting apparatus 202 of the present embodiment further includes a second idle regenerator 210. The second idle regenerator 210 is connected to a second serial master device via input/output connection 212. The second serial master device of the present embodiment is substantially similar to the second serial master device as discussed in FIG. 1. The second idle regenerator 210 is capable of receiving and transmitting signals to the second serial master device. Additionally, the second idle regenerator 210 is connected through connection 212 which is ported to the second serial master device though a PCI.

A third idle regenerator 214 is connected to the first and the second idle regenerators 206 & 210 and additionally to the serial disk drive 204. The third idle regenerator 214, included in the dual porting apparatus 202, is capable of transmitting and receiving signals from the first and second idle regenerators 206 & 210 and the serial disk drive 204, such as a SATA disk drive.

Further included in the dual porting apparatus 202, is synchronization logic 216 connected to the first, second and third idle regenerators 206, 210 and 216 respectively. The synchronization logic 216 is capable of synchronizing data transfers between one of the first and second idle regenerators 206 & 210 and the third idle generator 214. For example, the synchronization logic 216 is capable of synchronizing the third idle regenerator 214 with the second idle regenerator in the event of a desired switch in data stream input from the first idle regenerator 206 to the second idle regenerator 210. Furthermore, should an event occur which causes a disruption in synchronization in the dual porting apparatus, the synchronization logic 216 is utilized to reestablish synchronization between the third idle regenerator and the first or second idle regenerator as required by the circumstances.

In embodiments of the present invention the dual porting apparatus 202 further includes an auto detector 218. The auto detector 218 in the present embodiment is connected to the input/output of the first and the second serial masters devices 208 & 212, respectively as well as the synchronization logic 216.

For example, the auto detector 218 may be incorporated into the dual porting apparatus 102 which in turn is included in a disk drive canister 114 as discussed in FIG. 1 or the like. The auto detector 218 is capable of automatically switching between the first and second master devices based on the presence or absence of idle characters transmitted by either of the first and second master devices. The auto detector 218 is further capable of controlling the switching between the first and second serial master devices, thus allowing the input/output of data between the dual porting apparatus and one of the first and second master devices at a time.

In embodiments of the present invention the dual porting apparatus 202 is implemented as an application specific integrated circuit (ASIC).

Referring generally to FIG. 3, in an alternative embodiment a dual porting apparatus 302 may be capable of being switched between the first and the second serial master devices through control signals sent from an external source, such as a SATA master device.

It is believed that the DUAL PORTING SERIAL ATA DISK DRIVES FOR FAULT TOLERANT APPLICATIONS of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An information handling system, comprising:
   a first serial disk drive;
   a first dual port apparatus communicatively coupled to the first serial disk drive, the first serial disk drive and the first dual port apparatus being configured in a first disk drive canister, the first dual port apparatus further being communicatively coupled with a first serial master device and a second serial master device, the first dual port apparatus configured for dual porting the first serial disk drive to the first serial master device and the second serial master device;
   a second serial disk drive;
   a second dual port apparatus communicatively coupled to the second serial disk drive, the second serial disk drive and the second dual port apparatus being configured in a second disk drive canister, the second dual port apparatus further being communicatively coupled with the first serial master device and the second serial master device, the second dual port apparatus configured for dual porting the second serial disk drive to the first serial master device and the second serial master device;
   wherein the first serial master device and the second serial master device are each configured for receiving control signals for enabling the first serial master device and the second serial master device, the received control signals having been executed at a first level prior to being received by one of: the first serial master device and the second serial master device, the first serial master device and the second serial master device being located at a second level, the second level being a lower level than the first level, the received control signals ensuring that only one of: the first serial master device and the second serial master device is enabled at a given time, the first serial master device and the second serial master device being further configured for providing the received control signals to the first dual port apparatus and the second dual port apparatus for ensuring that no more than one of the first disk drive canister and the second disk drive canister is enabled at a given time.

2. An information handling system as claimed in claim 1, wherein the first serial master device and second serial master device are each further configured for selectively establishing a communicative connection between one of the first dual port apparatus and the second dual port apparatus and one of the first serial master device and the second serial master device.

3. An information handling system as claimed in claim 1, wherein the first dual port apparatus and the second dual port apparatus are each connected to the first serial master device and the second serial master device via a back panel of the information handling system and via Peripheral Component Interconnect (PCI) interfaces included in each of the serial master devices.

4. An information handling system as claimed in claim 1, wherein each serial master device includes a fibre channel connection.

5. An information handling system as claimed in claim 1, wherein each serial master device includes a uniprocessor.

6. An information handling system as claimed in claim 1, wherein each serial master device includes a memory.

7. A disk drive canister, comprising:
   a serial disk drive; and
   a dual port apparatus communicatively coupled to the serial disk drive, the dual port apparatus configured for being communicatively coupled with a first serial master device and a second serial master device, the dual port apparatus further configured for dual porting the serial disk drive to the first serial master device and the second serial master device, the first serial master device and the second serial master device being configured for receiving control signals for enabling the first serial master device and the second serial master device, the received control signals having been executed at a first level prior to being received by one of: the first serial master device and the second serial master device, the first serial master device and the second serial master device being located at a second level, the second level being a lower level than the first level, the received control signals ensuring that only one of the first serial master device and the second serial master device is enabled at a given time, the first serial master device and the second serial master device being further configured for providing the received control signals to the dual port apparatus,
   wherein the dual port apparatus is configured for receiving the control signals from at least one of the first serial master device and the second serial master device, said received control signals allowing for selective enablement and disablement of the disk drive canister.

8. A disk drive canister as claimed in claim 7, wherein the dual port apparatus is connected to the first serial master device and the second serial master via Peripheral Component Interconnect (PCI) interfaces included in each of the serial master devices.

9. A disk drive canister as claimed in claim 7, wherein the serial disk drive is a Serial Advanced Technology Attachment (SATA) disk drive.

10. A disk drive canister as claimed in claim 7, wherein the serial master devices are Serial Advanced Technology Attachment (SATA) master devices.

11. A disk drive canister as claimed in claim 7, wherein the serial master devices are each configured with a fibre channel connection.

12. A dual port apparatus, comprising:
    means for communicatively coupling with a serial disk drive;
    means for communicatively coupling with a first serial master device and a second serial master device, the first serial master device and the second serial master device being configured for receiving control signals for enabling the first serial master device and the second serial master device, the received control signals having been executed at a first level prior to being received by one of: the first serial master device and the second serial master device, the first serial master device and the second serial master device being located at a second level, the second level being a lower level than the first level, the received control signals ensuring that only one of: the first serial master device and the second serial master device is enabled at a given time;

means for dual porting the serial disk drive to the first serial master device and the second serial master device; and means for receiving control signals from at least one of the first serial master device and the second serial master device, said received control signals allowing for selective enablement and disablement of the dual port apparatus, wherein the first serial master device and the second serial master device are further configured for providing the received control signals to the dual porting means.

13. A dual port apparatus as claimed in claim 12, wherein the dual port apparatus is integrated within a disk drive canister.

14. A dual port apparatus as claimed in claim 13, wherein the serial disk drive is integrated within the disk drive canister.

15. A dual port apparatus as claimed in claim 12, wherein the serial master devices are each configured with a fibre channel connection.

16. A dual port apparatus as claimed in claim 12, wherein the serial disk drive is a Serial Advanced Technology Attachment (SATA) disk drive.

17. A dual port apparatus as claimed in claim 12, wherein the serial master devices are Serial Advanced Technology Attachment (SATA) master devices.

* * * * *